(12) United States Patent
Viesselmann et al.

(10) Patent No.: US 6,892,632 B1
(45) Date of Patent: May 17, 2005

(54) JOINTED BALE KICKER FOR A ROUND BALER

(75) Inventors: Kim P. Viesselmann, Grafton, WI (US); Anthony J. Glaszcz, Hartford, WI (US)

(73) Assignee: Gehl Company, West Bend, WI (US)

( * ) Notice: Subject to any disclaimer, the term of this patent is extended or adjusted under 35 U.S.C. 154(b) by 334 days.

(21) Appl. No.: 09/927,948

(22) Filed: Aug. 10, 2001

(51) Int. Cl.$^7$ .............................................. B30B 15/32
(52) U.S. Cl. ................... 100/99; 100/7; 56/341
(58) Field of Search .............................. 100/87–90, 99; 56/341–344

(56) References Cited

U.S. PATENT DOCUMENTS

| | | | | |
|---|---|---|---|---|
| 4,458,587 A | * | 7/1984 | Jennings ...................... | 100/88 |
| 4,566,380 A | * | 1/1986 | Clostermeyer et al. ....... | 100/89 |
| 4,821,637 A | * | 4/1989 | Viaud .......................... | 100/88 |
| 5,263,410 A | * | 11/1993 | Olin ............................ | 100/88 |

* cited by examiner

*Primary Examiner*—Allen Ostrager
*Assistant Examiner*—Shelley Self
(74) *Attorney, Agent, or Firm*—Boyle, Fredrickson, Newholm, Stein & Gratz, S.C.

(57) ABSTRACT

A round baler for forming round bales of agricultural crop material includes a bale kicker mechanism for ensuring that the bale is clear of the path of movement of the baler tailgate after the bale has been discharged from the baler and before movement of the tailgate from its open position to its closed position. The bale kicker mechanism includes an inner section which is movably mounted to the baler for movement between a raised position and a lowered position, and an outer section which is pivotably mounted to the inner bale kicker section, to form a jointed bale kicker construction. The inner bale kicker section extends downwardly and rearwardly from the bale-forming chamber at a relatively sharp angle when in its lowered position, to facilitate discharge of the bale from the bale-forming chamber. The outer bale kicker section defines an outer end which engages the ground when the inner bale kicker section is in its lowered position, to provide a ramp for moving the bale onto the ground. After the bale has been discharged, the inner bale kicker section is moved to its raised position, which lifts the outer bale kicker section upwardly so as to move the bale off the outer bale kicker section and to engage an end member of the outer bale kicker section with the outer surface of the bale. In this manner, the bale is maintained at a predetermined space rearwardly of the baler, to enable the tailgate to be moved to its closed position without interference from the bale. A bale exit sensor is employed to ensure that the bale is fully discharged from the bale-forming chamber before the tailgate is moved to its closed position.

22 Claims, 7 Drawing Sheets

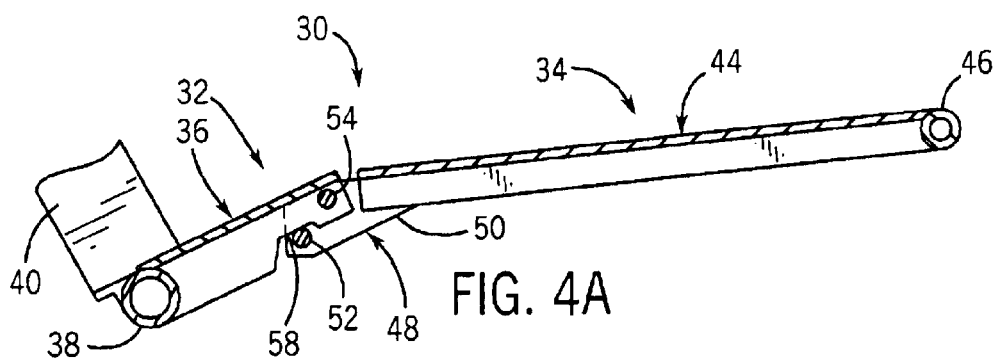
FIG. 4A
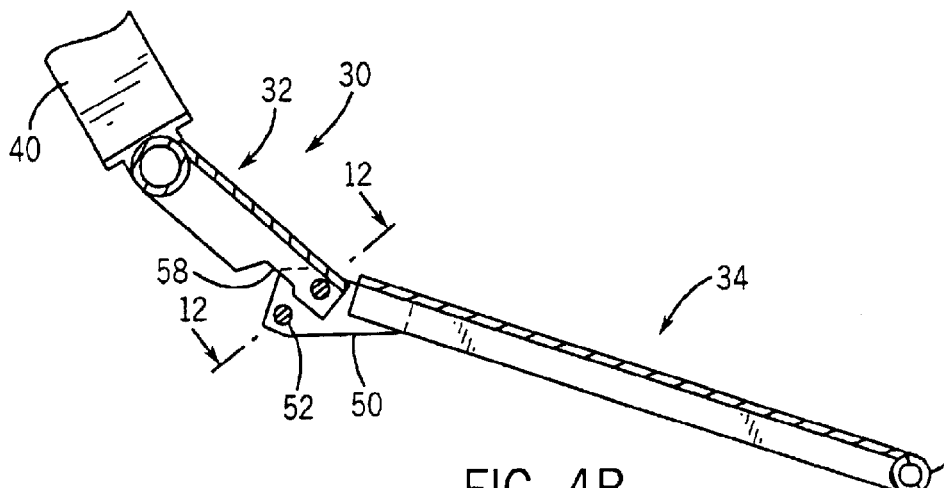
FIG. 4B
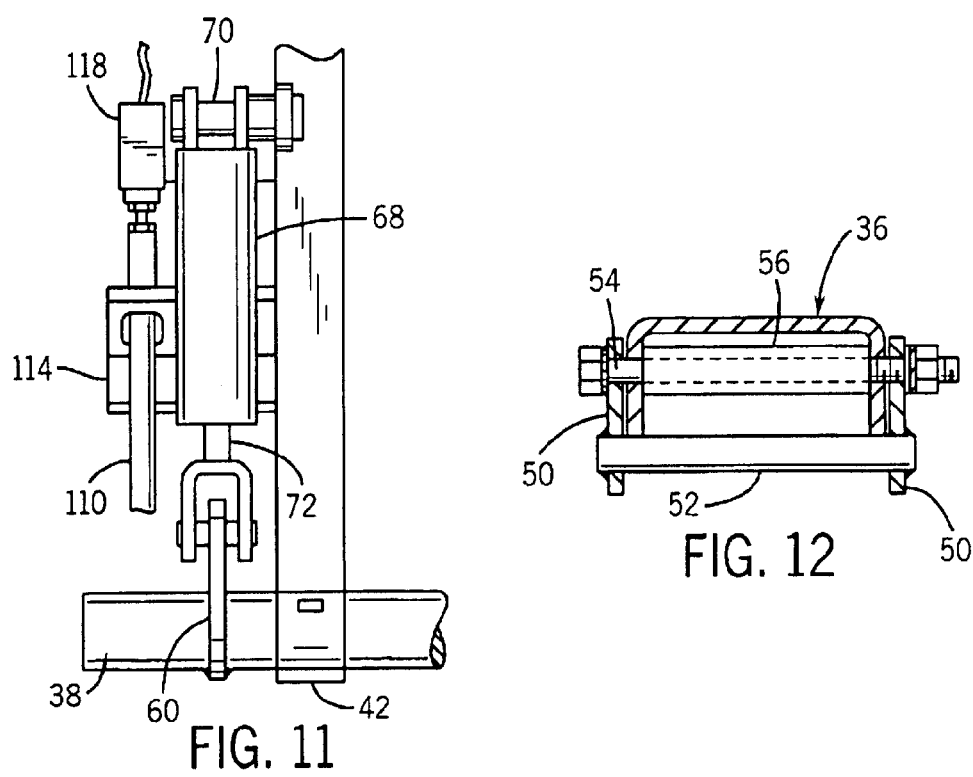
FIG. 11
FIG. 12

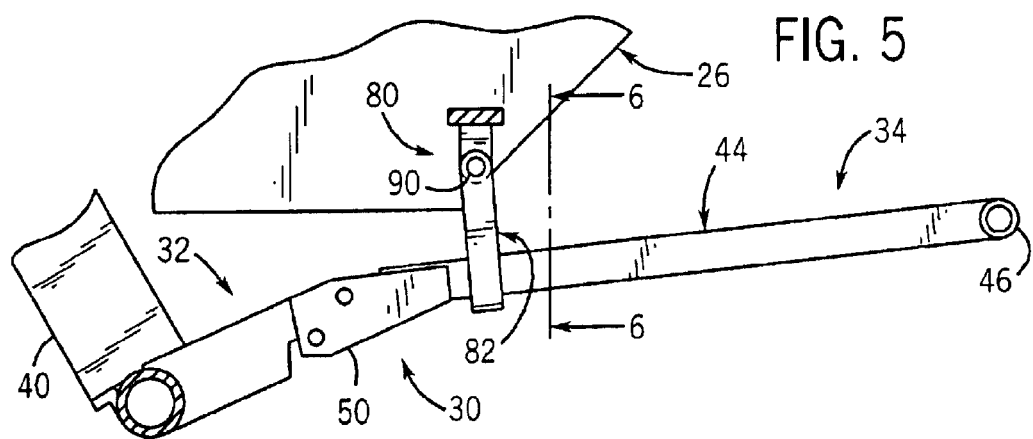
FIG. 5
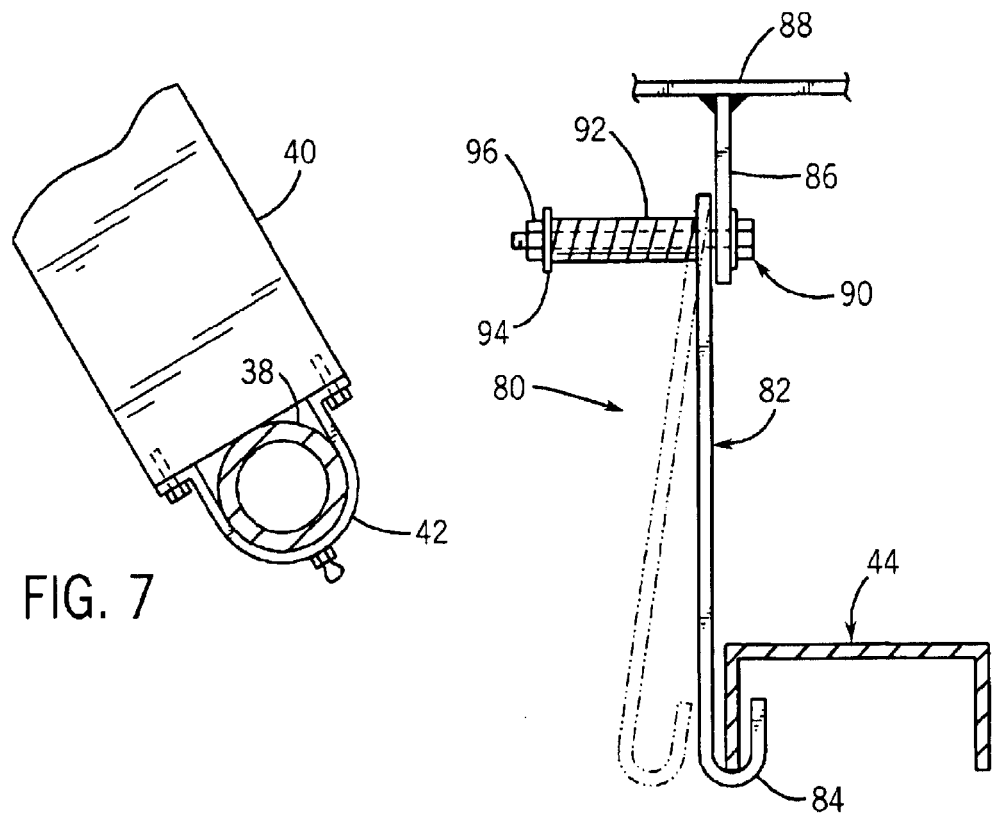
FIG. 7
FIG. 6

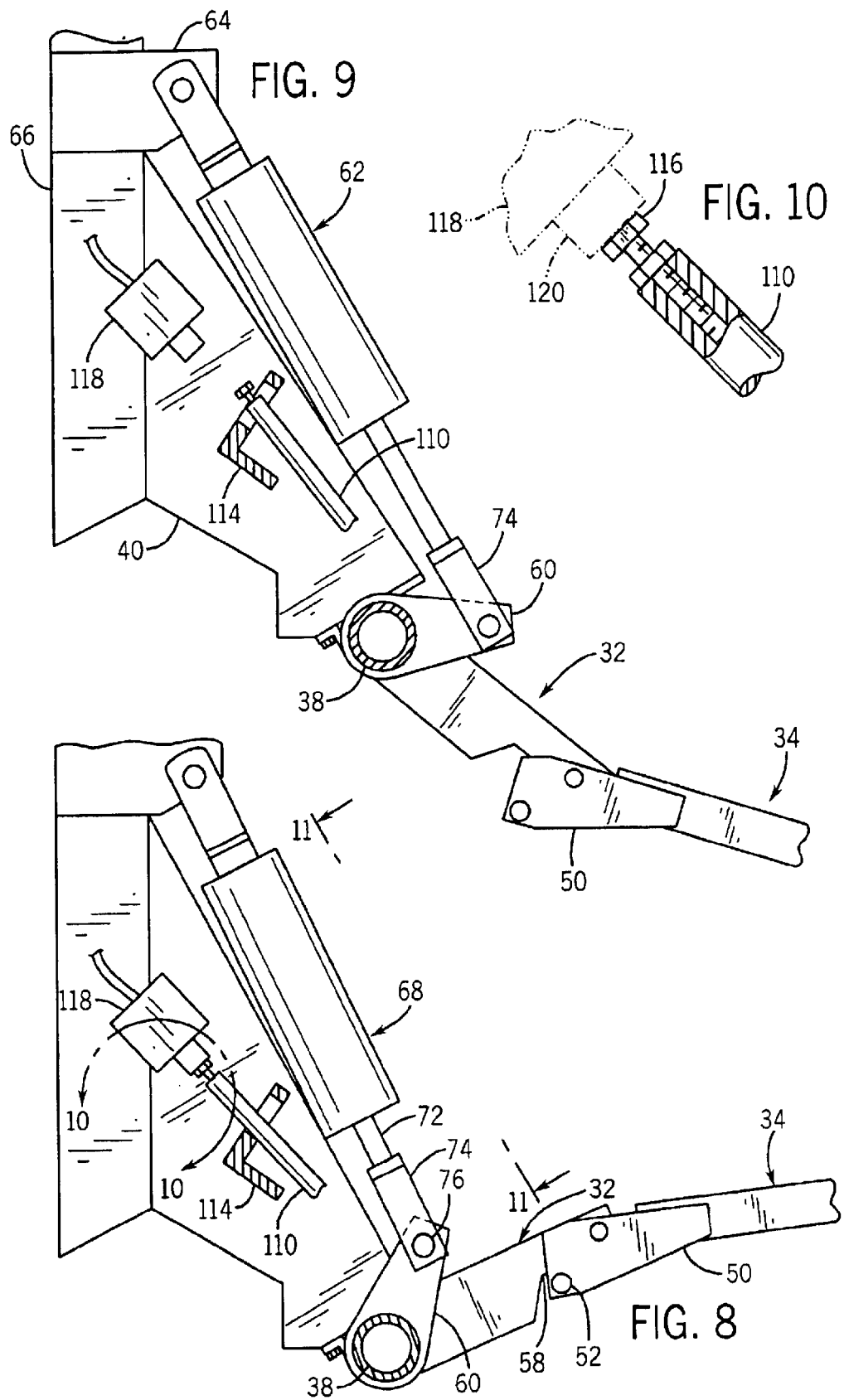

JOINTED BALE KICKER FOR A ROUND BALER

BACKGROUND AND SUMMARY OF THE INVENTION

This invention relates to balers for forming round bales of agricultural crop material, and more particularly to a bale kicker mechanism for use in combination with a round baler.

A round baler typically includes a bale-forming chamber defined by a series of side-by-side belts. Crop material is supplied to the bale-forming chamber from a pickup mechanism, and the belts function to roll the crop material into a round bale. When the bale has reached a predetermined size within the bale-forming chamber, a tailgate mechanism of the round baler is raised so as to open the bale-forming chamber and to discharge the bale rearwardly of the baler. The tailgate is then closed in preparation for forming a subsequent bale.

In order for the tailgate to properly close, the discharged bale must be located out of the path of movement of the tailgate from its open position to its closed position. In the past, it has been known to clear the path of the tailgate by moving the baler forwardly after discharging the bale from the baler. While this procedure works satisfactorily to clear the path of the tailgate, it is still possible for the bale to move into the path of the tailgate by movement of the bale on the ground if the bale is discharged on a downhill incline.

It is an object of the present invention to provide a bale kicker for use with a round baler, which ensures that the bale is moved rearwardly out of the path of the tailgate in order to provide clearance for movement of the tailgate from its open position to its closed position. It is a further object of the invention to provide such a bale locker mechanism which operates without movement of the baler, to eliminate the need to advance the baler to close the tailgate after the bale has been discharged. Yet another object of the invention is to provide such a bale kicker mechanism which also acts as a ramp for assisting in movement of the bale onto the ground after the bale is discharged from the bale-forming chamber. Yet another object of the invention is to provide such a bale kicker mechanism which incorporates a feature to ensure that the bale has been fully discharged from the baler before the tailgate can be moved to its closed position. A still further object of the invention is to provide such a bale kicker mechanism which is relatively simple in its components and operation, yet which provides highly satisfactory and reliable movement of the bale away from the baler and out of the path of the tailgate. A still further object of the invention is to provide such a bale kicker mechanism which can either be installed during original manufacture or which can be retrofit onto a baler subsequent to manufacture.

In accordance with the present invention, a bale kicker mechanism for use with a round baler includes an inner section movably mounted to the baler for movement between a lowered position and a raised position, and an outer section which is pivotably mounted to an outer end defined by the inner section. The outer bale kicker section defines an outer end member, and a stop arrangement is interposed between the inner end of the outer bale kicker section and the outer end of the inner bale kicker section. Movement of the inner bale kicker section from its raised position to its lowered position causes the outer end member of the outer bale kicker section to contact the ground, and the inner and outer bale kicker sections are placed in an obtuse angular relationship relative to each other. The inner bale kicker section slopes downwardly and rearwardly from the bale-forming chamber at a relatively sharp angle, to facilitate discharge of the bale from the bale-forming chamber. The outer bale kicker section is oriented at a lesser angle to act as a ramp for transitioning movement of the bale from the inner bale kicker section onto the ground.

The stop arrangement functions to fix the angular position of the outer bale kicker section relative to the inner bale kicker section during movement of the inner bale kicker section from its lowered position toward its raised position. Movement of the inner section of the kicker functions to initially lift the forward end of the outer kicker section upwardly, to increase the angle of incline of the outer bale kicker section. Continued movement of the inner bale kicker section toward its raised position causes the outer end member of the outer bale kicker section to lift upwardly above the ground, to move the bale off the outer bale kicker section and to engage the end member of the outer bale kicker section with the surface of the bale. The bale kicker thus functions to provide a predetermined minimum amount of space rearwardly of the baler, to enable the tailgate to be moved from its open position to its closed position.

The inner bale kicker section is preferably movable between its raised and lowered positions by operation of an extendible and retractable mechanism, such as a hydraulic cylinder assembly. The tailgate is also preferably moved between its open and closed positions by one or more hydraulic tailgate cylinder assemblies. A bale exit sensor is provided for ensuring that the bale is fully discharged from the bale-forming chamber before the tailgate can be moved from its open position to its closed position. The bale exit sensor may be in the form of an actuator which functions to actuate a valve interconnected in a hydraulic circuit with the tailgate hydraulic cylinder assemblies. The actuator selectively actuates the valve so as to provide operation of the hydraulic circuit to close the tailgate when the bale has been fully discharged from the bale-forming chamber. If the actuator does not engage the valve, which occurs when the presence of a bale is detected, operation of the hydraulic circuit is prevented and the tailgate cannot be moved to its closed position until the bale is cleared from the bale-forming chamber.

The invention further contemplates a round baler incorporating a bale kicker mechanism as well as a method of operating a round baler, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 4a is a partial section view taken along line 4a—4a of FIG. 2, showing the bale kicker mechanism in its raised position;

FIG. 4b is a view similar to FIG. 4a, showing the bale kicker mechanism in its lowered position;

FIG. 5 is a partial section view taken along line 5—5 of FIG. 2;

FIG. 6 is a partial section view taken along line 6—6 of FIG. 5;

FIG. 7 is a partial section view taken along line 7—7 of FIG. 2;

FIG. 8 is a partial section view taken along line 8—8 of FIG. 2, showing the bale kicker mechanism in its raised position;

FIG. 9 is a view similar to FIG. 8, showing the bale kicker mechanism in its lowered position;

FIG. 10 is an enlarged partial elevation view with reference to line 10—10 of FIG. 8;

FIG. 11 is a partial rear elevation view with reference to line 11—11 of FIG. 8;

FIG. 12 is a section view taken along line 12—12 of FIG. 4b;

DETAILED DESCRIPTION OF THE INVENTION

Figure 1:
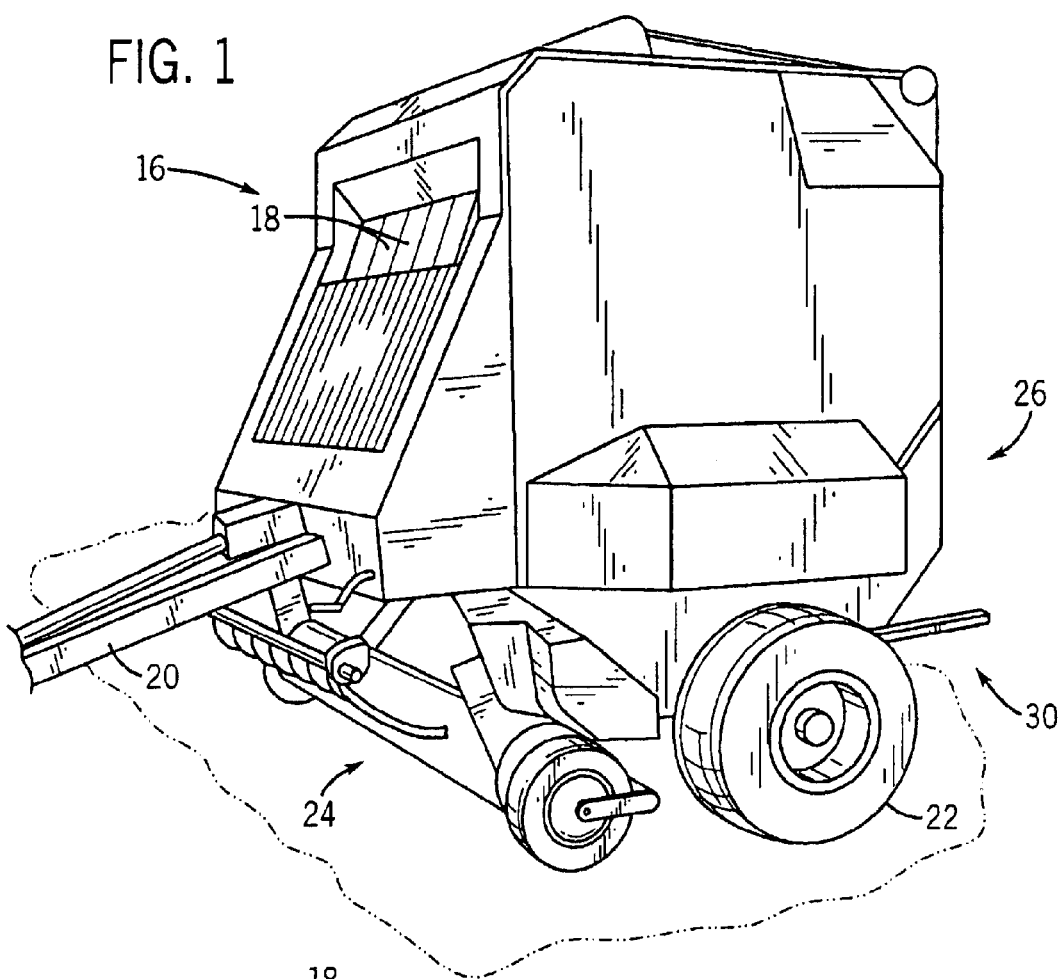
FIG. 1 is an isometric view of a round baler incorporating the bale kicker mechanism of the present invention.
Figure 2:
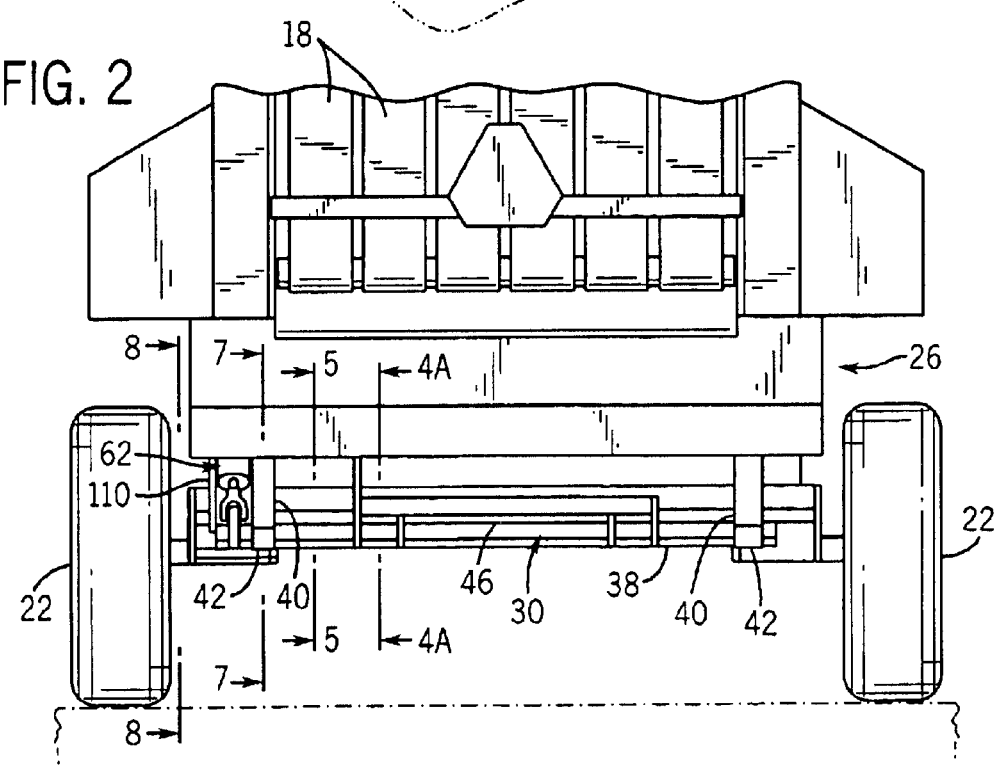
FIG. 2 is a partial rear elevation view of the baler of FIG. 1, showing the bale kicker mechanism in a raised position.

Referring to FIGS. 1–3, a round baler 16 including the bale kicker of the present invention includes a series of side-by-side belts 18 which define an internal bale-forming chamber within which a round bale of agricultural crop material is adapted to be formed. Baler 16 includes a tongue 20 adapted to be engaged with a tow vehicle such as a tractor, and a pair of wheels 22 which allow baler 16 to move along the ground behind the tow vehicle. A pickup mechanism 24 is adapted to lift crop material off the ground and to supply the crop material rearwardly to a crop inlet associated with baler 16, which forms the crop material into a round bale. An example of a satisfactory crop material feeding system is shown and described in copending application Ser. No. 09/636,427 filed Aug. 10, 2000, the disclosure of which is hereby incorporated by reference.

Figure 3A:
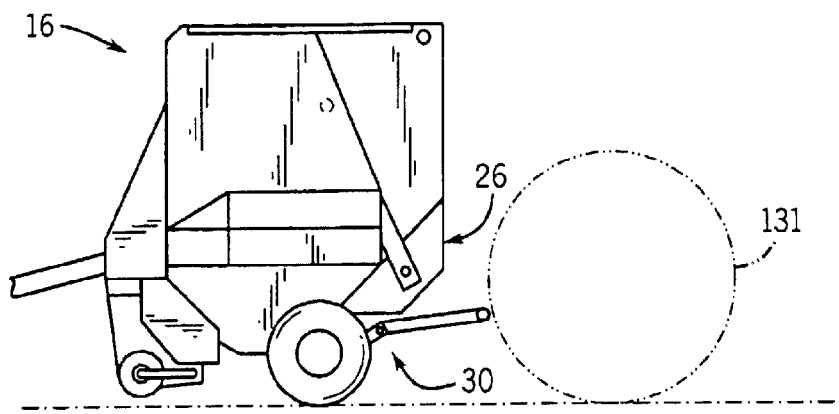
FIGS. 3a–3c are schematic side elevation views showing the baler of FIG. 1 and operation of the bale kicker mechanism to move the bale to a predetermined position rearwardly of the baler after discharge of the bale from the bale-forming chamber.
Figure 3B:
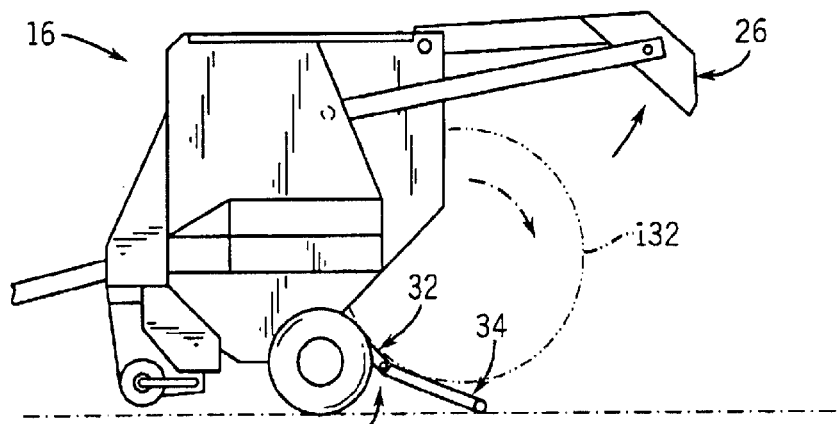
Figure 3C:
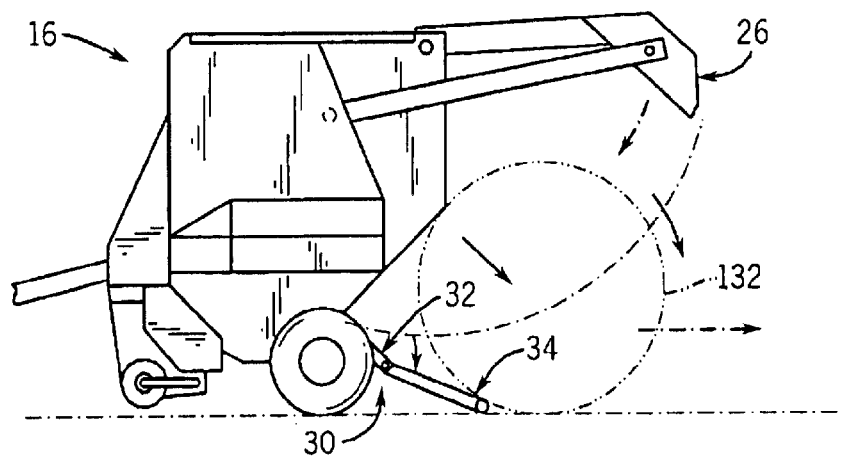

Baler 16 further includes a tailgate 26 with which baler belts 18 are engaged. Tailgate 26 is movable between a closed position as shown in FIGS. 1, 2 and 3a, and an open position as shown in FIGS. 3b and 3c. In a manner as is known, tailgate 26 is maintained in its closed position during bale formation, and is moved to its open position so as to enable a bale, shown at B, to be discharged from the bale-forming chamber of baler 16.

In accordance with the present invention, baler 16 includes a bale kicker 30 which performs the dual function of receiving bale B upon discharge from the bale-forming chamber of baler 16 and facilitating movement of bale B onto the ground, and for preventing bale B from rolling back toward baler 16 during movement of tailgate 26 from its open position toward its closed position.

Referring to FIGS. 4a and 4b, bale kicker 30 generally includes an inner section 32 and an outer section 34. Inner section 32 is in the form of a pair of spaced apart inner inverted channel-shaped members 36, each of which is mounted at its inner end to a pivot tube 38. As shown in FIG. 7, pivot tube 38 extends transversely between a pair of bale kicker supports 40 which are secured to the frame of baler 16. Pivot tube 38 is pivotably mounted to the lower end of each bale kicker support 40 via a pivot bracket 42 (FIG. 7). Pivot tube 38 extends along a longitudinal axis, which defines a horizontal transverse axis about which bale kicker inner section 32 is pivotable.

Bale kicker outer section 34 is pivotably mounted at its inner end to inner section 32. Bale kicker outer section 34 includes a pair of outer inverted channel-shaped members 44, each of which is engaged at its outer end with a transverse outer end member 46, which may have a tubular configuration. A pivot bracket 48 is rigidly mounted to the inner end of each outer channel member 44.

Each pivot bracket 48 includes a pair of spaced apart side members 50, the outer ends of which are rigidly secured to one of outer channel members 44 in any satisfactory manner, such as by welding. The inner end area of each side member 50 extends inwardly from the inner end of its respective outer channel member 44. Each pivot bracket 48 further includes a transverse stop member 52 which extends between and is secured to side members 50. Side members 50 of each pivot bracket 48 include aligned openings, which are adapted to be placed into alignment with aligned transverse openings formed in the depending side walls of one of inner channel members 36, toward the outer end of the inner channel member 36. A pivot bolt 54 extends through the aligned openings in side members 50 and the side walls of inner channel member 36, as shown in FIG. 12. The shank of pivot bolt 54 extends through a sleeve 56, and defines a transverse axis about which bale kicker outer section 34 is pivotable relative to bale kicker inner section 32.

The side walls of inner channel members 36 are formed with downwardly facing notches defining a downwardly facing engagement surface 58. As shown in FIG. 4a, stop member 52 contacts engagement surfaces 58 when bale kicker inner section 32 is raised upwardly in a manner to be explained, so as to cause bale kicker outer section 34 to move upwardly along with bale kicker inner section 32.

Referring to FIGS. 8, 9 and 11, an outwardly extending ear 60 is mounted toward one end of pivot tube 38. An extendible and retractable hydraulic kicker cylinder assembly 62 is interconnected between ear 60 and a mounting bracket 64 secured to a vertical frame member 66 of baler 16. Kicker cylinder assembly 62 includes a cylinder 68 pivotably mounted to bracket 64 via a pivot pin 70. Kicker cylinder assembly 62 further includes an extendible and retractable rod 72 which is pivotably mounted to ear 60 by means of a clevis 74 and a pin 76, which extends between the legs of clevis 74 and through an opening formed in gear 60. Kicker cylinder assembly 62 is operable to move bale kicker 30 between a lowered discharge position as shown in FIG. 9 upon extension of kicker cylinder assembly 62, and a raised position of FIG. 8 upon retraction of kicker cylinder assembly 62 by causing pivoting movement of pivot tube 38 due to the offset provided by ear 60.

Referring to FIGS. 5 and 6, a transport latch assembly 80 is interposed between bale kicker 30 and tailgate 26 for maintaining bale kicker 30 in its raised position during transport of baler 16 or when baler 16 is otherwise not in operation. Transport latch assembly 80 includes a latch member 82 having a hook 84 at its lower end. The upper end of latch member 82 is pivotally mounted to a latch mounting member 86 secured to a structural cross member 88 defined by tailgate 26. Latch member 82 is pivotable about a pivot axis defined by a bolt 90 which extends through aligned openings in latch member 82 and latch mounting member 86. Bolt 90 includes an elongated shank which extends through a spring 92, which bears between latch member 82 and a washer 94 engaged with a nut 96, which in turn is threadedly engaged with the shank of bolt 90. With this construction, spring 92 biases latch member 82 toward a vertical latching position as shown in solid lines in FIG. 6. When latch member 82 is in its latching position, hook 84 is adapted to receive the outer depending side wall of one of outer channel members 44, to suspend bale kicker outer section 34 from tailgate 26. This functions to relieve stress on the pivot connection between bale kicker outer section 34 and inner section 32 during transport, and to ensure that bale kicker remains in a raised position when not in use. The side wall of outer channel member 44 is engaged with hook 84 by manually pivoting latch member 82 outwardly to a release position, as shown in phantom in FIG. 6, and lifting bale kicker outer section 34 upwardly so that the lower end of the side wall of outer channel member 44 is located above hook 84. Manual engagement with latch member 84 is then released, so that latch member 82 returns to its latching position under the force of spring 92 to bring hook 84 into alignment with the side wall of outer channel member 44. The operator then lowers bale kicker outer section 34 to engage the side wall of outer channel member 44 with hook 84. Prior to operation of baler 16, the above steps are reversed so as to disengage transport latch assembly 80 from bale kicker 30.

In the event the operator neglects to disengage transport latch assembly 80 prior to use and commences bale formation, transport latch assembly 80 and bale kicker outer section 34 are configured so as to automatically disengage transport latch assembly 80 when tailgate 26 is raised. Such disengagement is caused by hook 84 sliding along the lower edge of the side wall of outer channel member 44 as tailgate 26 is raised. This causes bale kicker outer section 34 to be lifted about the pivot connection of bale kicker outer section 34 with bale kicker inner section 32. When hook 84 reaches the end of bale kicker outer section 34 during opening of tailgate 26, hook 84 contacts outer end member 46 of bale kicker outer section 34. The curved surface of outer end member 46 engages hook 84, which slides along the outer surface of outer end member 46 and subsequently moves clear of outer end member 46. When this occurs, bale kicker outer section 34 pivots downwardly by gravity. At this time, bale kicker inner section 32 has been pivoted to its lowered position in preparation for receiving the bale to be discharged from the bale-forming chamber of baler 16, and outer end member 46 contacts the ground in the manner as shown in FIG. 4b so as to facilitate transfer of the bale onto the ground.

FIGS. 3a–3c illustrate normal operation of bale kicker 30 in facilitating discharge of a bale B. FIG. 3a illustrates bale kicker 30 in its raised, retaining position by operation of kicker cylinder assembly 62, after a bale B1 has been discharged from baler 16 and tailgate 26 has been moved to its closed position. Baler 16 is then operated to form a subsequent bale in the bale-forming chamber of baler 16. The subsequent bale, shown in FIG. 3b at B2, is then discharged from the bale-forming chamber of baler 16 by moving tailgate 26 to its open position as shown in FIG. 3b. Prior to or during such movement of tailgate 26, however, kicker cylinder assembly 62 is extended so as to move bale kicker inner section 32 toward its lowered position of FIG. 4b, which causes outer end member 46 of bale kicker outer section 34 to come into contact with the ground. This normally results in outer end member 46 engaging the ground before bale kicker inner section 32 is fully lowered, to cause an angular offset between bale kicker outer section 34 and inner section 32. Bale kicker inner section 32 is oriented at a steeper angle than bale kicker outer section 34. When tailgate 26 is opened, bale B2 first falls onto bale kicker inner section 32 and then rolls onto bale kicker outer section 34, as shown in FIG. 3b. Bale B2 then rolls onto the ground, as shown in FIG. 3c. Bale kicker 30 is then moved upwardly by retraction of kicker cylinder assembly 62, which causes bale kicker inner section 32 to move from its lowered position of FIG. 4b to its raised position of FIG. 4a. As bale kicker 30 is raised in this manner, bale kicker outer section 34 remains under bale B2 during initial movement of bale kicker inner section 34 away from its lowered position. This functions to increase the angle of incline of outer bale kicker section 34, to ensure that bale B is moved off outer bale kicker section 34 and onto the ground under the influence of gravity. Once bale kicker inner section 32 is raised an amount sufficient to cause engagement surfaces 58 to contact stop members 52, bale kicker outer section 34 is lifted along with bale kicker inner section 32 so as to raise outer end member 46 off the ground. Outer end member 46 contacts the lower forward surface of bale B2, so as to roll bale B2 rearwardly on the ground as bale kicker 30 is moved to its raised position. If bale B2 has rolled rearwardly an amount sufficient to clear bale kicker outer section 34, such movement of bale kicker 34 to its raised position functions to bring outer end member 46 to a position in which bale B2 cannot subsequently roll forwardly into the path of tailgate 26. In any case, once bale kicker 30 has been moved to its raised position, tailgate 26 is moved to its closed position without interference with bale B2.

Figure 13:
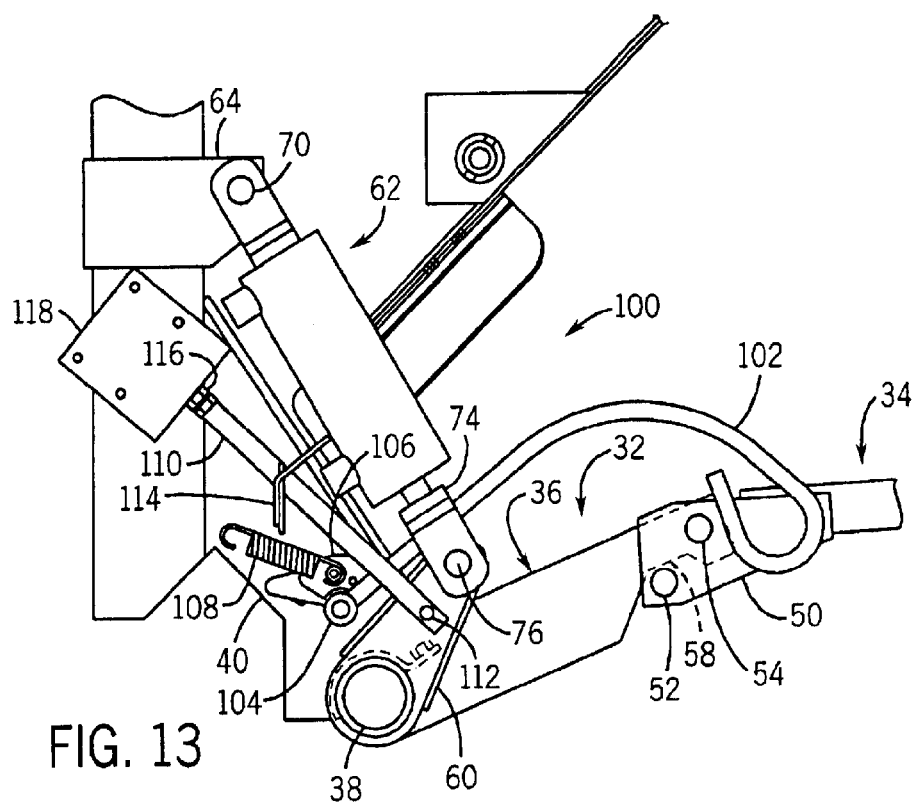
FIG. 13 is a partial side elevation view showing a bale exit sensor interconnected with the bale kicker mechanism incorporated into the baler of FIG. 1, showing an actuator member of the bale exit sensor in an operative position.
Figure 14:
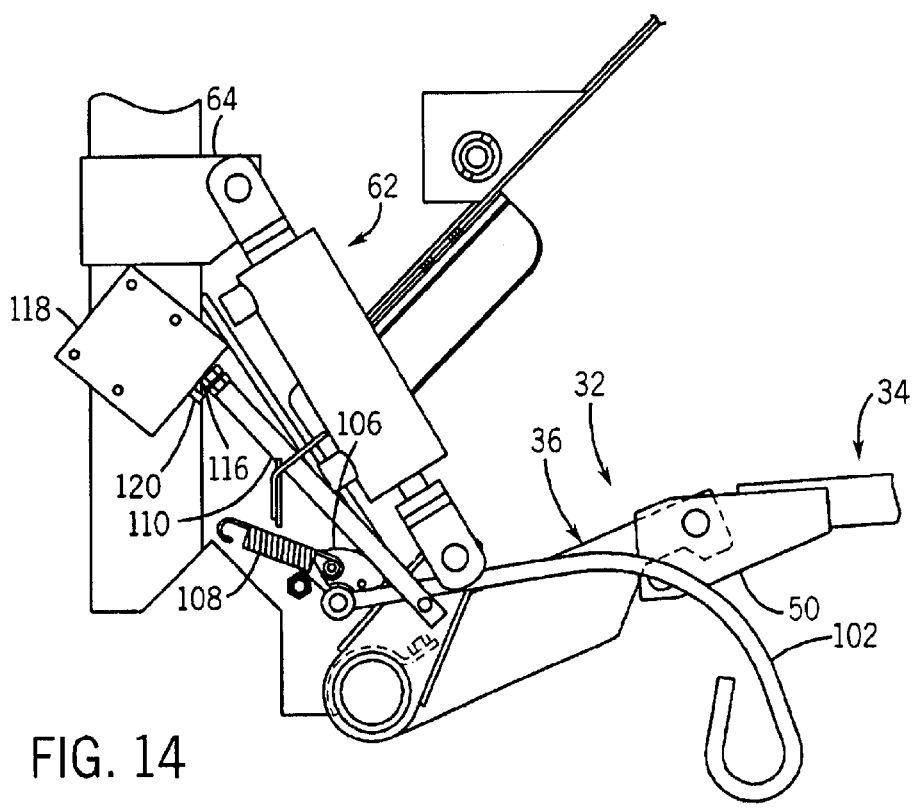
FIG. 14 is a view similar to FIG. 13, showing the actuator member in an inoperative position.

Referring to FIGS. 13 and 14, a bale exit sensor 100 is located adjacent bale kicker inner section 32, for ensuring that the bale has been discharged from the bale-forming chamber of baler 16 before tailgate 26 is closed. Bale exit sensor 100 includes a curved bale sensing finger 102 which is pivotably mounted to bale kicker support 40 via a pivot shaft 104 and a suitable bearing arrangement. Bale sensing finger 102 is configured so as to be located above bale kicker inner section 32 when bale kicker inner section 32 is moved to its raised position by operation of kicker cylinder assembly 62.

A cam 106 is fixed to pivot shaft 104. A spring 108 is engaged between cam 106 and bale kicker support 40, and functions to bias bale sensing finger 102 upwardly toward its raised position of FIG. 13.

A push rod 110 is pivotably mounted to the upper surface of one of inner channel members 36 via a pivot shaft 112. Push rod 110 extends through a slot-shaped opening formed in a guide bracket 114 secured to bale kicker support 40. The upper end of push rod 110 includes a head 116 at its upper end. Head 116 may be in the form of the head of a screw received within a threaded passage formed in the upper end of push rod 110, for adjusting the axial position of head 116 and thereby the effective length of push rod 110.

Figure 15:
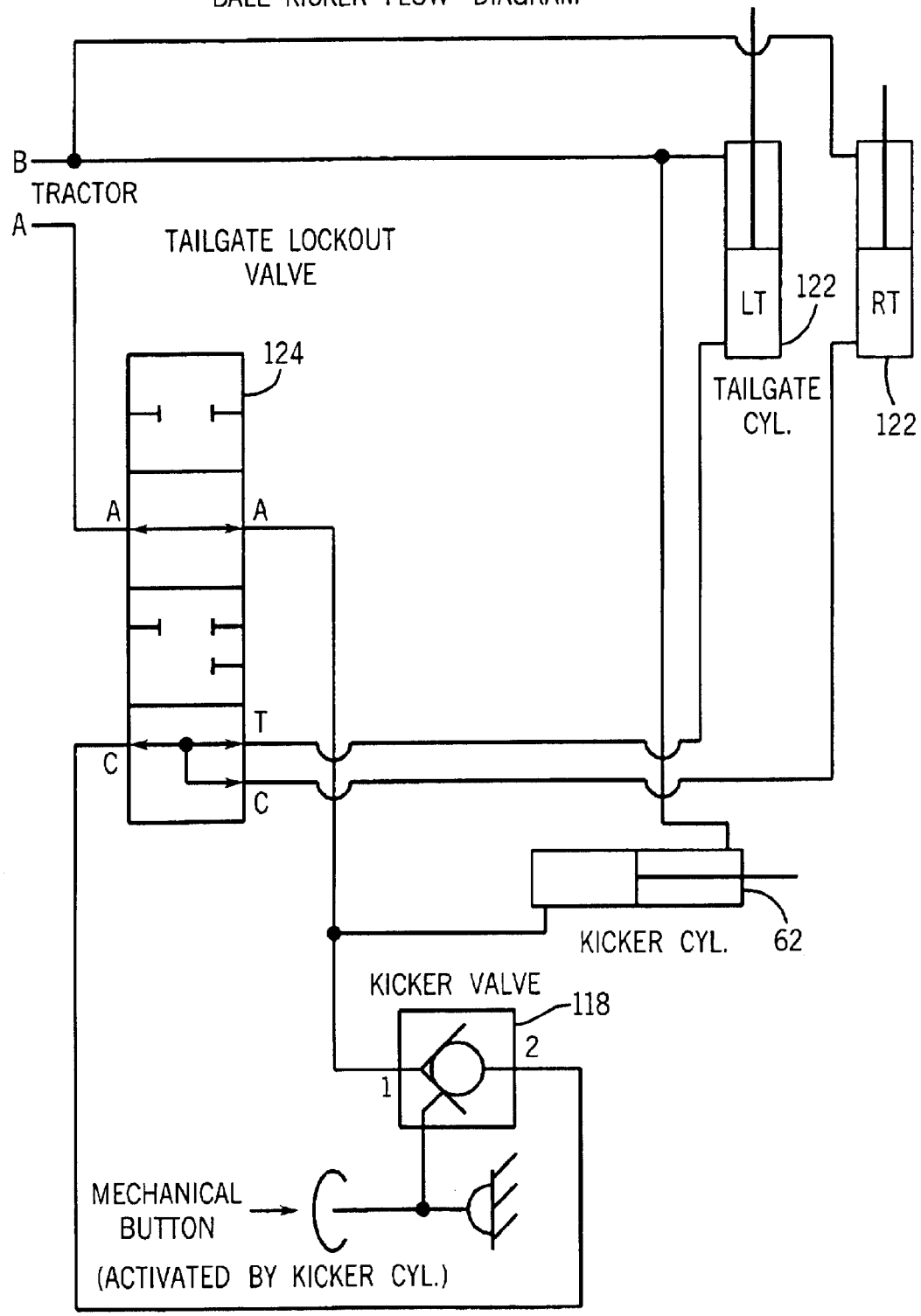
FIG. 15 is a schematic hydraulic diagram illustrating interconnection of the bale exit sensor of FIGS. 13 and 14 with the tailgate cylinder assemblies incorporated into the baler of FIG. 1.

A kicker valve 118 is mounted in the vicinity of the upper end of push rod 110. Kicker valve 118 includes an external actuator button 120 (FIG. 14). As shown in FIG. 15, kicker valve 118 is arranged in a tailgate hydraulic control circuit which includes kicker hydraulic cylinder assembly 62, a pair of tailgate hydraulic cylinder assemblies 122, and a tailgate lockout valve 124.

In operation, bale exit sensor 100 functions as follows to ensure that the bale has been fully discharged from the bale-forming chamber of baler 16 before operation of tailgate cylinder assemblies 122 to close tailgate 26. When the bale has been discharged so as to be clear of bale kicker inner section 32 and the innermost area of bale kicker outer section 34, bale sensing finger 102 is in its normal raised position of FIG. 13 so as to extend above bale kicker inner section 32. This means that the bale has at least moved onto the area of bale kicker outer section 34 outwardly of the joint between bale kicker inner section 32 and outer section 34, such that raising of bale kicker inner section 32 will cause the bale to be moved off bale kicker outer section 34 and clear of tailgate 26, as described previously.

In the event bale kicker 30 is moved to its raised position but the bale has not been fully discharged from the bale-forming chamber of baler 16, such as can occur due to friction between the ends of the bale with the side sheets of baler 16, the presence of the bale causes bale sensing finger 102 to be moved downwardly to its position of FIG. 14 against the force of spring 108. With finger 102 in its lowered position and upon movement of bale kicker 30 to its raised position as shown in FIG. 14, cam 106 engages push rod 110 so as to pivot push rod 110 to a position out of alignment with valve button 120. When this occurs, kicker valve 118 prevents the supply of fluid to the rod side of tailgate cylinder assemblies 122, so as to prevent retraction of tailgate cylinder assemblies 122 to close tailgate 26. The operator can then take appropriate steps to remove the bale from the bale-forming chamber of baler 16. Once the bale has moved past bale sensing finger 102, spring 108 functions to return bale sensing finger 102 to its raised position, which allows push rod 110 to pivot by gravity to its position of FIG. 13, in alignment with button 120 of kicker valve 118. When this occurs, push rod 110 engages valve button 120 such that fluid pressure can be supplied to the rod ends of tailgate cylinder assemblies 122, so as to retract tailgate cylinder assemblies 122 and close tailgate 26.

Tailgate lockout valve 124 functions to prevent operation of kicker cylinder assembly 62 when tailgate cylinder assembles 122 are extended to open tailgate 26, to prevent kicker 30 from being raised when tailgate 26 is open.

While the invention has been shown and described with respect to certain details, it is understood that variations are possible without departing from the scope of the present invention. For example, and without limitation, the pivot connection between the inner and outer sections of the bale kicker may be any type of satisfactory pivot connection which includes a stop arrangement to lift the outer kicker section when the inner kicker section attains a predetermined position. The structure of the kicker sections can vary from the details of the structure as described, so long as the kicker sections are capable of supporting the weight of the bale as the bale moves from the bale-forming chamber onto the ground. While only outer end member of the outer kicker section has been shown and described as engaging the ground when the kicker is lowered, it is also possible that a separate ground-engaging section or the entirety of the outer kicker section may engage the ground when the kicker is lowered. Further, while the kicker is shown and described as being raised and lowered using a hydraulic cylinder assembly, the kicker may also be raised and lowered using a mechanical lifting and lowering system. Regarding the bale exit sensor, the failure to fully discharge the formed bale can be detected in any other type of system which interfaces with the tailgate closing system for preventing the tailgate from being closed if the bale is not fully discharged.

Various alternatives and embodiments are contemplated as being within the scope of the following claims particularly pointing out and distinctly claiming the subject matter regarded as the invention.

We claim:

1. A bale kicker assembly for a round baler having a bale-forming chamber and a tailgate movable between a closed position during formation of the bale within the bale-forming chamber and an open position for discharging the bale from the bale-forming chamber, comprising:

an inner kicker section located below of the bale-forming chamber, wherein the inner kicker section defines an inner end and an outer end, wherein the inner end of the inner kicker section is pivotably mounted to the baler and wherein the inner kicker section is movable between a lowered discharge position and a raised position, and wherein movement of the inner kicker section between the lowered discharge position and the raised position moves the outer end of the inner kicker section vertically between a lowered position and a raised position;

an outer kicker section having an inner end pivotably mounted to the outer end of the inner kicker section and an outer end spaced rearwardly therefrom, wherein the outer kicker section is adapted to engage the ground when the inner kicker section is in its lowered position, and is raised above the ground when the inner kicker section is in its raised position; and a lifting and lowering arrangement interconnected with the inner kicker section for moving the inner kicker section between its raised and lowered positions;

wherein, when the inner kicker section is in its lowered position and the outer end of the outer kicker section is engaged with the ground, a bale discharged from the bale-forming chamber is received by the inner kicker section and moves away from the bale-forming chamber on the inner kicker section and the outer kicker section and, when the inner kicker section is moved to its raised position from its lowered position, the bale is moved off the outer kicker section and the outer end of the outer kicker section is positioned so as to prevent the bale from rolling toward the baler.

2. The bale kicker assembly of claim 1, wherein the inner end of the outer kicker section is pivotably mounted to the outer end of the inner kicker section for movement about a substantially horizontal pivot axis.

3. A bale kicker assembly for a round baler having a bale-forming chamber and a tailgate movable between a closed position during formation of the bale within the bale-forming chamber and an open position for discharging the bale from the bale-forming chamber, comprising:

an inner kicker section located below of the bale-forming chamber, wherein the inner kicker section is movable between a lowered discharge position and a raised position;

an outer kicker section having an inner end pivotably mounted to the inner kicker section and an outer end spaced rearwardly therefrom, wherein the outer kicker section is adapted to engage the ground when the inner kicker section is in its lowered position, and is raised above the sound when the inner kicker section is in its raised position, wherein the inner end of the outer kicker section is pivotably mounted to the inner kicker section for movement about a substantially horizontal pivot axis;

a lifting and lowering arrangement interconnected with the inner kicker section for moving the inner kicker section between its raised and lowered positions;

wherein, when the inner kicker section is in its lowered position and the outer end of the outer kicker section is engaged with the ground, a bale discharged from the bale-forming chamber is received by the inner kicker section and moves away from the bale-forming chamber on the inner kicker section and the outer kicker section and, when the inner kicker section is moved to its raised position from its lowered position, the bale is moved off the outer kicker section and the outer end of the outer kicker section is positioned so as to prevent the bale from rolling toward the baler; and a stop arrangement interposed between the outer kicker section and the outer end of the inner kicker section for lifting the outer kicker section upon movement of the inner kicker section to its raised position.

4. The bale kicker assembly of claim 3, wherein the stop arrangement comprises a stop member secured to the inner end of the outer kicker section and a stop surface on the inner kicker section, wherein the stop member and stop surface are configured to maintain the outer end of the outer kicker section in engagement with the ground during initial movement of the inner kicker section from its lowered position toward its raised position, and thereafter engage each other to lift the outer end of the outer kicker section above the ground so as to move the bale off the outer kicker section, wherein the outer end of the outer kicker section engages the bale after movement of the bale off the outer kicker section to prevent the bale from rolling toward the baler.

5. The bale kicker assembly of claim 2, further comprising a transport latch member interconnected with the tailgate and engageable with the outer kicker section for maintaining the outer kicker section above the ground when the baler is not in use.

6. A bale kicker assembly for a round baler having a bale-forming chamber and a tailgate movable between a closed position during formation of the bale within the bale-forming chamber and an open position for discharging the bale from the bale-forming chamber, comprising:

an inner kicker section located below of the bale-forming chamber, wherein the inner kicker section is movable between a lowered discharge position and a raised position;

an outer kicker section having an inner end pivotably mounted to the inner kicker section and an outer end spaced rearwardly therefrom, wherein the outer kicker section is adapted to engage the ground when the inner kicker section is in its lowered position, and is raised above the ground when the inner kicker section is in its raised position, wherein the inner end of the outer kicker section is pivotably mounted to the inner kicker section for movement about a substantially horizontal pivot axis;

a lifting and lowering arrangement interconnected with the inner kicker section for moving the inner kicker section between its raised and lowered positions;

wherein, when the inner kicker section is in its lowered position and the outer end of the outer kicker section is engaged with the ground, a bale discharged from the bale-forming chamber is received by the inner kicker section and moves away from the bale-forming chamber on the inner kicker section and the outer kicker section and, when the inner kicker section is moved to its raised position from its lowered position, the bale is moved off the outer kicker section and the outer end of the outer kicker section is positioned so as to prevent the bale from rolling toward the baler; and a transport latch member interconnected with the tailgate and engageable with the outer kicker section for maintaining the outer kicker section above the ground when the baler is not in use, wherein the transport latch member comprises a hook member engageable with the outer kicker section, and wherein the outer kicker section and the hook member are configured such that movement of the tailgate to its open position causes the hook member to move along the outer kicker section such that the hook member moves out of engagement with the outer kicker section so as to allow movement of the outer kicker section.

7. The bale kicker assembly of claim 2, wherein the inner end of the inner kicker section is mounted to the baler for pivoting movement about a substantially horizontal pivot axis between its raised and lowered positions.

8. The bale kicker assembly of claim 7, wherein the lifting and lowering arrangement comprises a cylinder assembly interconnected with the inner kicker section, wherein the cylinder assembly includes an extendible and retractable member operable to cause movement of the inner kicker section between its lowered and raised positions.

9. A round baler, comprising:

a bale-forming chamber defined by a series of side-by-side baler belts;

a tailgate with which the baler belts are engaged, wherein the tailgate is movable between a closed position during bale formation and an open position for discharging the bale rearwardly from the bale-forming chamber; and a bale kicker for facilitating movement of the bale onto the ground when the tailgate is in its open position and the bale is discharged from the bale-forming chamber, comprising an inner section located below the bale-forming chamber, wherein the inner section defines an inner end and an outer end and, wherein the inner end of the inner section is pivotably mounted to the baler for movement between a raised retaining position and a lowered discharge position, wherein the outer end of the inner section is moveable vertically between a raised position and a lowered position during movement of the inner section between the raised retaining position and the lowered discharge position, and an outer section movably mounted to the outer end of the inner section, wherein the outer section is configured to engage the ground when the inner section is in its lowered position to facilitate movement of the bale onto the ground, and is configured to engage the bale when the inner section is moved to its raised retaining position to prevent movement of the bale toward the baler during movement of the tailgate from its open position toward its closed position.

10. The round baler of claim 9, wherein the outer section of the bale kicker is movably mounted to the outer end of the inner section by means of a pivot connection interposed between the outer end of the inner section of the bale kicker and an inner end defined by the outer section of the bale kicker.

11. The round baler of claim 10, wherein the pivot connection enables the outer section of the bale kicker to pivot freely relative to the inner section when the inner section is moved to its lowered discharge position, in response to engagement of an outer end defined by the outer section with the ground, and further comprising a stop arrangement interposed between the inner section and the outer section of the bale kicker for lifting the outer section upwardly when the inner section is moved from its lowered discharge position to its raised retaining position.

12. A round baler, comprising:

a bale-forming chamber defined by a series of side-by-side baler belts;

a tailgate with which the baler belts are engaged, wherein the tailgate is movable between a closed position during bale formation and an open position for discharging the bale rearwardly from the bale-forming chamber; and a bale kicker for facilitating movement of the bale onto the ground when the tailgate is in its open position and the bale is discharged from the bale-forming chamber, comprising an inner section located below the bale-forming chamber, wherein the inner section is movable between a raised retaining position and a lowered discharge position, and an outer section movably mounted to the inner section, wherein the outer section is configured to engage the ground when the inner section is in its lowered position to facilitate movement of the bale onto the ground, and is configured to engage the bale when the inner section is moved to its raised retaining position to prevent movement of the bale toward the baler during movement of the tailgate from its open position toward its closed position;

wherein the outer section of the bale kicker is movably mounted to the inner section by means of a pivot connection interposed between the inner section of the bale kicker and an inner end defined by the outer section of the bale kicker, wherein the pivot connection enables the outer section of the bale kicker to pivot freely relative to the inner section when the inner section is moved to its lowered discharge position, in response to engagement of an outer end defined by the outer section with the ground; and a stop arrangement interposed between the inner section and the outer section of the bale kicker for lifting the outer section upwardly when the inner section is moved from its lowered discharge position to its raised retaining position, wherein the stop arrangement is configured so as to lift the outer end of the outer section upwardly when the inner section attains a predetermined position during movement from its lowered discharge position toward its raised retaining position, to move the bale off the outer section of the bale kicker, and to maintain the outer end of the outer section at an elevation above the ground sufficient to prevent the bale from rolling on the ground toward the baler when the inner section of the bale kicker is in its raised retaining position.

13. The round baler of claim 9, further comprising a sensor arrangement for detecting the presence of a bale on the bale kicker when the tailgate is in its open position, and for preventing movement of the tailgate from its open position toward its closed position when the bale is located in a predetermined position on the bale kicker.

14. The round baler of claim 13, wherein the tailgate is movable between its open and closed positions by means of one or more tailgate cylinder assemblies which are extendible and retractable so as to move the tailgate between its open and closed positions, wherein the sensor arrangement interacts with a pressurized fluid circuit in which the tailgate cylinder assemblies are arranged, so as to prevent operation of the tailgate cylinder assemblies to move the tailgate to its closed position from its open position.

15. A round baler, comprising:

a bale-forming chamber defined by a series of side-by-side baler belts;

a tailgate with which the baler belts are engaged, wherein the tailgate is movable between a closed position during bale formation and an open position for discharging the bale rearwardly from the bale-forming chamber; and a bale kicker for facilitating movement of the bale onto the ground when the tailgate is in its open position and the bale is discharged from the bale-forming chamber, comprising an inner section located below the bale-forming chamber, wherein the inner section is movable between a raised retaining position and a lowered discharge position, and an outer section movably mounted to the inner section, wherein the outer section is configured to engage the ground when the inner section is in its lowered position to facilitate movement of the bale onto the ground, and is configured to engage the bale when the inner section is moved to its raised retaining position to prevent movement of the bale toward the baler during movement of the tailgate from its open position toward its closed position; and a sensor arrangement for detecting the presence of a bale on the bale kicker when the tailgate is in its open position, and for preventing movement of the tailgate from its open position toward its closed position when the bale is located in a predetermined position on the bale kicker, wherein the tailgate is movable between its open and closed positions by means of one or more tailgate cylinder assemblies which are extendible and retractable so as to move the tailgate between its open and closed positions, wherein the sensor arrangement interacts with a pressurized fluid circuit in which the tailgate cylinder assemblies are arranged, so as to prevent operation of the tailgate cylinder assemblies to move the tailgate to its closed position from its open position, wherein the sensor arrangement includes a pivotable arm movable between a first position when engaged with a bale in a predetermined location on the bale kicker, and a second position when the bale is moved outwardly past the predetermined location on the bale kicker, wherein the arm is interconnected with a valve actuator, wherein the valve actuator is movable from an operative position in which the valve actuator actuates a valve in the pressurized fluid circuit when the inner section of the bale kicker is moved from its lowered discharge position to its raised retaining position and the arm is in its first position, and is movable to a disengaged position in which the valve actuator fails to actuate the valve when the inner section of the bale kicker is moved from its lowered discharge position to its raised retaining position, wherein failure to actuate the valve prevents operation of the tailgate cylinder assemblies so as to prevent movement of the tailgate from its open position toward its closed position.

16. The round baler of claim 10, further comprising a transport latch arrangement interposed between the tailgate and the outer section of the bale kicker, wherein the transport latch arrangement is operable to maintain the outer section of the bale kicker in an elevated position when the round baler is not in use.

17. A round baler, comprising:

a bale-forming chamber defined by a series of side-by-side baler belts;

a tailgate with which the baler belts are engaged, wherein the tailgate is movable between a closed position during bale formation and an open position for discharging the bale rearwardly from the bale-forming chamber; and a bale kicker for facilitating movement of the bale onto the ground when the tailgate is in its open position and the bale is discharged from the bale-forming chamber, comprising an inner section located below the bale-forming chamber, wherein the inner section is movable between a raised retaining position and a lowered discharge position and an outer section movably mounted to the inner section, wherein the outer section is configured to engage the ground when the inner section is in its lowered position to facilitate movement of the bale onto the ground, and is configured to engage the bale when the inner section is moved to its raised retaining position to prevent movement of the bale toward the baler during movement of the tailgate from its open position toward its closed position, wherein the outer section of the bale kicker is movably mounted to the inner section by means of a pivot connection interposed between the inner section of the bale kicker and an inner end defined by the outer section of the bale kicker; and a transport latch arrangement interposed between the tailgate and the outer section of the bale kicker, wherein the transport latch arrangement is operable to maintain the outer section of the bale kicker in an elevated position when the round baler is not in use wherein the transport latch arrangement comprises a depending latch member extending downwardly from the tailgate and engaged with the outer section of the bale kicker, and wherein the latch member is adapted to move along the outer section of the bale kicker during movement of the tailgate from its closed position toward its open position, and wherein the latch member and the outer section of the bale kicker are configured so as to enable the latch member to move out of engagement with the outer section of the bale kicker when the tailgate is moved to its open position.

18. A method of discharging a round bale from the bale-forming chamber of a round baler, wherein the round baler includes a tailgate movable between a closed position during bale formation and an open position for discharging the bale from the bale-forming chamber, comprising the steps of:

positioning a movable bale kicker rearwardly of the bale-forming chamber, wherein the bale kicker includes an inner section movable between a raised and lowered position and an outer section pivotably mounted to the inner section, wherein the inner section includes an inner end pivotably mounted to the baler for movement between the raised and lowered positions, and wherein the outer section is pivotably mounted to the outer end of the inner section, wherein movement of the inner section between the raised and lowered positions moves the outer end of the inner section vertically between a raised position and a lowered position;

moving the bale kicker inner section to its lowered position so as to receive a bale discharged from the bale-forming chamber, wherein movement of the bale kicker inner section to its lowered position moves the outer end of the inner section to the lowered position and causes at least an outer end defined by the bale kicker outer section to engage the ground, wherein the bale is adapted to travel from the bale kicker inner section onto the bale kicker outer section when the inner section is in its lowered position;

subsequently moving the bale kicker inner section toward its raised position, wherein the bale kicker outer section is adapted to move upwardly during movement of the inner end of the bale kicker inner section from its lowered position toward its raised position, wherein upward movement of the bale kicker outer section results in the outer end of the bale kicker outer section being raised off the ground so as to move the bale off the bale kicker outer section and to engage the outer end of the bale kicker outer section with the bale and to thereby prevent movement of the bale toward the baler.

19. The method of claim 18, further comprising the step of moving the tailgate from its open position to its closed position after movement of the bale kicker inner section from its lowered position to its raised position.

20. The method of claim 19, further comprising the step of preventing movement of the tailgate from its open position to its closed position in the event the bale has not moved past a predetermined position on the bale kicker when the bale kicker inner section has been moved to its raised position.

21. The method of claim 20, wherein the step of preventing movement of the tailgate from its open position to its closed position is carried out by sensing the presence of a bale at or inwardly of the predetermined position on the bale kicker, and disabling operation of a pressurized fluid circuit within which one or more tailgate cylinders are connected, wherein the tailgate cylinders are operable to move the tailgate between its open and closed positions.

22. A bale kicker mechanism for use with a round baler having a bale-forming chamber and a tailgate interconnected with a tailgate operating mechanism which is operable to move the tailgate between a closed position during bale formation and an open position for discharging the bale from the round baler, comprising:

a bale kicker movable between a lowered position when the tailgate is moved to its open position so as to receive the bale discharged from the bale-forming chamber and to facilitate movement of the bale from the bale-forming chamber onto the ground, and a raised position in which the bale kicker is moved upwardly from its lowered position; and a sensing arrangement interconnected with the tailgate operating mechanism for sensing the presence of a bale at or inwardly of a predetermined position on the bale kicker, wherein the sensing arrangement functions to prevent operation of the tailgate operating mechanism so as to move the tailgate toward its closed position in the event the bale is located at or inwardly of the predetermined position on the bale kicker;

wherein the tailgate operating mechanism comprises one or more extendible and retractable tailgate cylinder assemblies interconnected in a pressurized fluid circuit, and wherein the sensing arrangement interacts with the pressurized fluid circuit so as to prevent operation of the tailgate cylinder assemblies to move the tailgate to its closed position in the event the bale is located at or inwardly of the predetermined position on the bale kicker, and;

wherein the sensing arrangement includes a biased arm member located in the path of movement of the bale as the bale moves on the bale kicker at or inwardly of the predetermined location on the bale kicker, and a valve actuator interconnected with the biased arm member, wherein the valve actuator is in a first position when the biased arm member is not engaged with a bale wherein movement of the bale kicker to its raised position causes the valve actuator to actuate a valve in the pressurized fluid circuit so as to allow operation of the tailgate cylinder assemblies so as to move the tailgate from its open position to its closed position, and wherein the valve actuator is moved to a second position in response to engagement of the biased arm member with a bale wherein, when the valve actuator is in its second position, the valve actuator fails to actuate the valve upon movement of the bale kicker to its raised position, wherein failure to actuate the valve prevents operation of the pressurized fluid circuit to prevent movement of the tailgate cylinder assemblies to move the tailgate toward its closed position.

* * * * *

UNITED STATES PATENT AND TRADEMARK OFFICE
CERTIFICATE OF CORRECTION

PATENT NO. : 6,892,632 B1
DATED : May 17, 2005
INVENTOR(S) : Kim P. Viesselmann et al.

It is certified that error appears in the above-identified patent and that said Letters Patent is hereby corrected as shown below:

Column 8,
Line 59, delete "sound" and substitute therefore -- ground --;

Column 13,
Line 7, after "position" insert -- , --;
Line 25, after "use" insert -- , --.

Signed and Sealed this

Twelfth Day of July, 2005

JON W. DUDAS
*Director of the United States Patent and Trademark Office*